(12) United States Patent
Baldwin et al.

(10) Patent No.: US 11,481,843 B2
(45) Date of Patent: Oct. 25, 2022

(54) SYSTEMS AND METHODS FOR PRESENTING MULTIMEDIA CONTENT

(71) Applicant: The Toronto-Dominion Bank, Toronto (CA)

(72) Inventors: Gregory John Baldwin, Toronto (CA); Bruno Sandre, Toronto (CA); Arjun Nanda, Mississauga (CA); Daniel Sourani, Toronto (CA); Shaun Chinapen, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 106 days.

(21) Appl. No.: 17/175,553

(22) Filed: Feb. 12, 2021

(65) Prior Publication Data
US 2022/0261891 A1    Aug. 18, 2022

(51) Int. Cl.
*G06F 16/30*    (2019.01)
*G06Q 40/04*    (2012.01)
(Continued)

(52) U.S. Cl.
CPC .......... *G06Q 40/04* (2013.01); *G06F 16/435* (2019.01); *G06F 16/4393* (2019.01); *G06Q 40/06* (2013.01)

(58) Field of Classification Search
CPC ...... G06Q 40/04; G06Q 40/06; G06F 16/435; G06F 16/4393
See application file for complete search history.

(56) References Cited

U.S. PATENT DOCUMENTS 7,698,163 B2    4/2010   Reed et al.
7,783,545 B2    8/2010   Sloan et al.
(Continued)

FOREIGN PATENT DOCUMENTS

CN    109063198 A  *  12/2018
CN    109472646 A     3/2019
(Continued)

OTHER PUBLICATIONS

Article entitled "Learn how to Invest with TD Direct Invest Learning Centre", by Moorhouse, dated Sep. 12, 2019. (Year: 2019).*

*Primary Examiner* — Mahesh H Dwivedi
(74) *Attorney, Agent, or Firm* — Rowand LLP (57) ABSTRACT

A computer-implemented method is disclosed. The method includes: obtaining, via a server storing a plurality of data records, historical access data in connection with at least one data record; obtaining media engagement data indicating user engagement of media content in connection with the at least one data record; determining a learning content data set associated with the at least one data record based on the historical access data and the media engagement data, the learning content data set including a plurality of media content sets that are associated with defined learning objectives, wherein determining the learning content data set includes: determining a mapping of media content items to the plurality of media content sets; and determining an order associated with the media content sets, detecting one or more trigger conditions associated with the at least one data record; and in response to detecting the one or more trigger conditions: automatically identifying a subset of the learning content data set based on determining a mapping of the one or more trigger conditions to at least one of the defined learning objectives; and generating media recommendation
(Continued)

data including the identified subset of the learning content data set.

20 Claims, 6 Drawing Sheets

(51) Int. Cl.
    *G06Q 40/06*     (2012.01)
    *G06F 16/438*     (2019.01)
    *G06F 16/435*     (2019.01)

(56) References Cited

U.S. PATENT DOCUMENTS

| | | | |
|---|---|---|---|
| 8,930,258 B2 | 1/2015 | Triplett et al. | |
| 10,636,094 B2 | 4/2020 | Noonan | |
| 11,367,132 B1 * | 6/2022 | Catsifas | G06Q 40/02 |
| 2006/0010066 A1 | 1/2006 | Rosenthal et al. | |
| 2008/0250067 A1 * | 10/2008 | Svendsen | G06F 16/4387 |
| 2011/0173134 A1 | 7/2011 | Mabbitt | |
| 2012/0078937 A1 * | 3/2012 | Hall | G06F 16/435 |
| | | | 707/786 |
| 2013/0085965 A1 | 4/2013 | Dai | |
| 2014/0258175 A1 | 9/2014 | Twombly et al. | |
| 2015/0095260 A1 | 4/2015 | Ma et al. | |
| 2015/0296240 A1 * | 10/2015 | McDonough | H04N 21/2351 |
| | | | 725/31 |
| 2017/0301015 A1 | 10/2017 | Tunnell | |
| 2018/0158142 A1 | 6/2018 | Gunther | |
| 2018/0165758 A1 | 6/2018 | Saxena et al. | |
| 2018/0270283 A1 * | 9/2018 | Bostick | G06Q 10/10 |
| 2022/0124409 A1 * | 4/2022 | Wang | H04N 21/252 |

FOREIGN PATENT DOCUMENTS

| | | | | |
|---|---|---|---|---|
| EP | 2288986 A1 * | 3/2011 | | B60N 2/002 |
| WO | WO-2004052010 A1 * | 6/2004 | | G06Q 30/02 |

\* cited by examiner

SYSTEMS AND METHODS FOR PRESENTING MULTIMEDIA CONTENT

TECHNICAL FIELD

The present disclosure relates to digital media platforms and, in particular, to systems and methods for selectively presenting content on a multimedia platform.

BACKGROUND

Computer systems may be utilized in managing resource accounts containing different types and quantities of resources. For example, a resource server associated with a business entity may control access to data and account operations for resource accounts that are associated with customers of the business entity. A resource account may indicate current holdings of certain resources, or assets, that have specific values. The resources may, for example, include tradeable objects whose perceived or actual values are susceptible to change.

A common feature of resource management systems is facilitating trading activities in connection with resource accounts. Trading activities result in changes in the quantities and/or associated values of the resources. For example, a resource management system may enable resource acquisition (e.g., purchase) activities in connection with one or more of the resources, thereby increasing holdings of those resources in the resource account.

A resource management system may implement a resource account management platform for managing users' resource accounts. The resource account management platform may be accessed via an interface that allows users to initiate various account-related actions, such as conducting market research, monitoring resource account data (e.g., portfolio performance data), and engaging in trading activities (e.g., executing trade orders) in connection with their resource accounts. The interface may be configured to selectively present content, such as multimedia content, to account owners that use the platform.

The suite of functionalities offered by a resource account management platform may be only as useful for effective resource management as the level of sophistication of the individual account owners. In particular, a platform that is designed to facilitate learning for account owners may enhance their capacity to manage resources effectively. Accordingly, it would be desirable to provide a resource account management platform that integrates technical implementations of learning tools for account owners.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In an aspect, a computing system is disclosed. The computing system includes a processor, a communications module coupled to the processor, and a memory coupled to the processor. The memory stores instructions that, when executed, configure the processor to: obtain, via a server storing a plurality of data records, historical access data in connection with at least one data record; obtain media engagement data indicating user engagement of media content in connection with the at least one data record; determine a learning content data set associated with the at least one data record based on the historical access data and the media engagement data, the learning content data set including a plurality of media content sets that are associated with defined learning objectives, wherein determining the learning content data set includes: determining a mapping of media content items to the plurality of media content sets; and determining an order associated with the media content sets, detect one or more trigger conditions associated with the at least one data record; and in response to detecting the one or more trigger conditions: automatically identify a subset of the learning content data set based on determining a mapping of the one or more trigger conditions to at least one of the defined learning objectives; and generate media recommendation data including the identified subset of the learning content data set.

In some implementations, the at least one data record may be associated with a resource account and the historical access data may comprise transaction events data in connection with the resource account.

In some implementations, the media engagement data may comprise an indication of one or more media content items that are accessed by a user associated with the at least one data record.

In some implementations, determining the order associated with the media content sets may comprise determining a sequence for presenting the media content items of the plurality of media content sets to a user associated with the at least one data record.

In some implementations, the sequence may be determined based on content data associated with the media content items and a current learning status associated with the user in relation to the defined learning objectives.

In some implementations, the learning objectives may be defined based on user input associated with the at least one data record.

In some implementations, detecting the one or more trigger conditions associated with the at least one data record may comprise detecting a change to at least one of the historical access data or the media engagement data.

In some implementations, detecting a change to the historical access data may comprise determining a change in a quantity of resources associated with the at least one data record based on data record access actions.

In some implementations, detecting a change to the media engagement data may comprise detecting a change in preference data for media content items consumed in connection with the at least one data record.

In some implementations, the instructions, when executed, may further configure the processor to transmit media content items associated with the media recommendation data.

In another aspect, a computer-implemented method is disclosed. The method includes: obtaining, via a server storing a plurality of data records, historical access data in connection with at least one data record; obtaining media engagement data indicating user engagement of media content in connection with the at least one data record; determining a learning content data set associated with the at least one data record based on the historical access data and the media engagement data, the learning content data set including a plurality of media content sets that are associated with defined learning objectives, wherein determining the learning content data set includes: determining a mapping of media content items to the plurality of media content sets; and determining an order associated with the media content sets, detecting one or more trigger conditions associated with the at least one data record; and in response to detecting the one or more trigger conditions: automatically identifying a subset of the learning content data set based on determining a mapping of the one or more trigger conditions to at least one of the defined learning objectives; and generating media recommendation data including the identified subset of the learning content data set.

In yet another aspect, a non-transitory computer readable storage medium is disclosed. The computer readable storage medium contains instructions thereon which, when executed by a processor, configure the processor to: obtain, via a server storing a plurality of data records, historical access data in connection with at least one data record; obtain media engagement data indicating user engagement of media content in connection with the at least one data record; determine a learning content data set associated with the at least one data record based on the historical access data and the media engagement data, the learning content data set including a plurality of media content sets that are associated with defined learning objectives, wherein determining the learning content data set includes: determining a mapping of media content items to the plurality of media content sets; and determining an order associated with the media content sets, detect one or more trigger conditions associated with the at least one data record; and in response to detecting the one or more trigger conditions: automatically identify a subset of the learning content data set based on determining a mapping of the one or more trigger conditions to at least one of the defined learning objectives; and generate media recommendation data including the identified subset of the learning content data set.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "tradeable object" refers to any object which may be traded. A certain quantity of a tradeable object may be bought or sold for a particular price. A tradeable object may include, without limitation, stocks, options, bonds, future contracts, currency, warrants, derivatives, securities, commodities, swaps, interest rate products, index-based products, goods, or a combination thereof. More generally, a tradeable object may include a product listed and/or administered by an exchange or marketplace, a product defined by an entity, a combination of real and synthetic products, or a combination thereof.

The present application relates to resource management and, more particularly, to methods for selectively presenting multimedia content on a resource account management platform. A resource account management platform may provide users access to various functionalities for managing their resource accounts. By way of example, a resource account management platform may allow users to conduct trading activities in connection with resources associated with the users' resource accounts. The suite of functionalities offered by a resource account management platform may be only as useful for effective resource management as the level of sophistication of the individual account owners. By advancing the account owners' level of knowledge and understanding in regard to the effects of various account-related operations (e.g., real-time trading, resource transfers, etc.), a resource account management platform may support sustained growth in and/or efficient deployment of resources. Accordingly, it is desirable for a resource account management platform to integrate learning tools for educating resource account owners.

Various technical solutions for delivering customized media content on a resource account management platform are described in the present disclosure.

Figure 1:
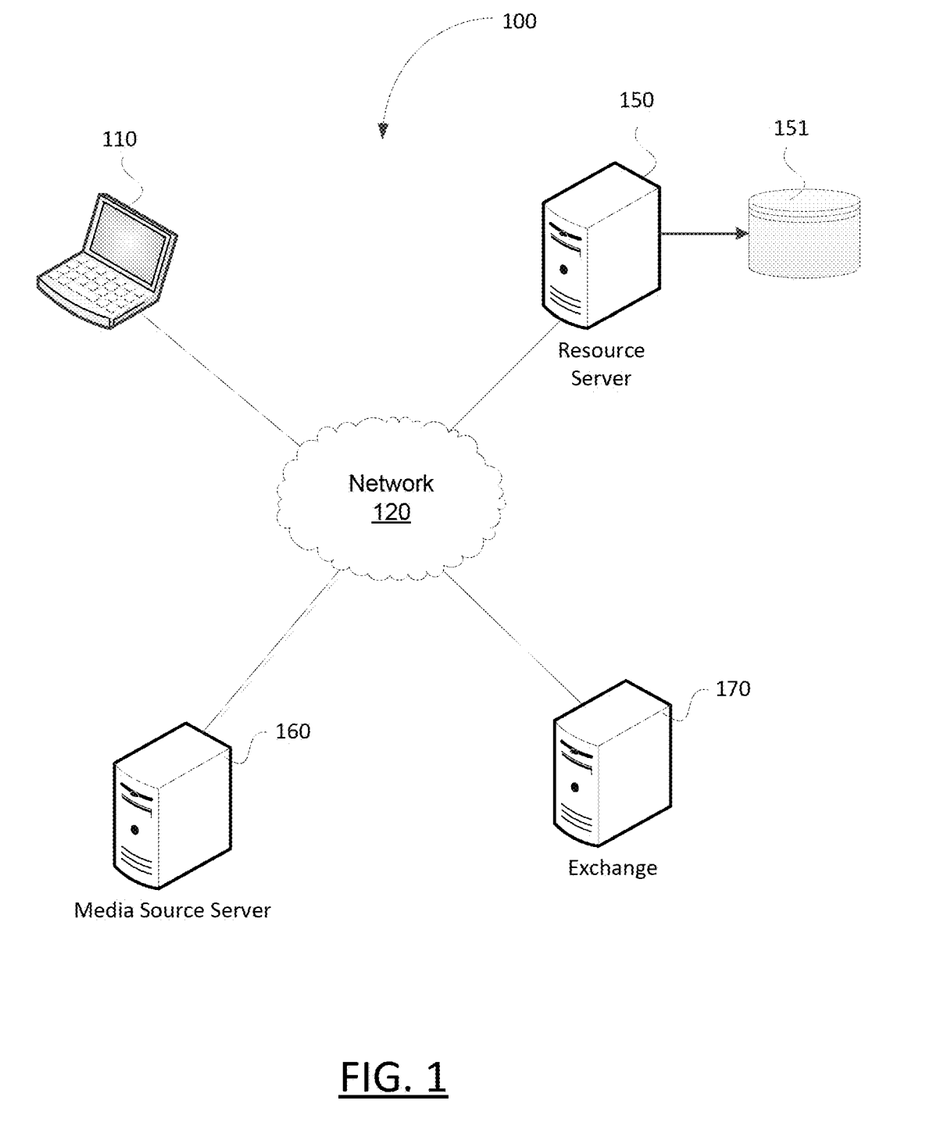
FIG. 1 is a schematic diagram illustrating an operating environment of an example embodiment.

FIG. 1 illustrates an exemplary computing environment 100 consistent with certain disclosed embodiments. As shown in FIG. 1, the computing environment 100 may include one or more client devices 110, a resource server 150, a database 151 associated with the resource server 150, a media source server 160, an exchange 170, and a communications network 120 connecting one or more of the components of computing environment 100.

As illustrated, a resource server 150 (which may also be referred to as a server computer system) and client device 110 communicate via the network 120. In at least some embodiments, the client device 110 is a computing device. The client device 110 may take a variety of forms including, for example, a mobile communication device such as a smartphone, a tablet computer, a wearable computer such as a head-mounted display or smartwatch, a laptop or desktop computer, or a computing device of another type. The client device 110 is associated with a client entity (e.g., an individual, an organization, etc.) having resources that are managed by or via the resource server 150. For example, the resource server 150 may be a financial institution server and the client entity may be a customer of a financial institution operating the financial institution server. The client device 110 may store software instructions that cause the client device to establish communications with the resource server 150 and, in some embodiments, one or more exchanges 170 that are associated with markets (e.g., stock market, foreign exchange market, etc.).

The resource server 150 may track, manage, and maintain resources, make lending decisions, and/or lend resources to a client entity associated with the client device 110. The resources may, for example, be computing resources, such as memory or processor cycles. In at least some embodiments, the resources may include stored value, such as fiat currency, which may be represented in a database. For example, the resource server 150 may be coupled to a database 151, which may be provided in secure storage. The secure storage may be provided internally within the resource server 150 or externally. The secure storage may, for example, be provided remotely from the resource server 150. For example, the secure storage may include one or more data centers. The data centers may, for example, store data with bank-grade security.

The database 151 may include records for a plurality of accounts and at least some of the records may define a quantity of resources associated with the client entity. For example, the client entity may be associated with an account having one or more records in the database 151. The records may reflect a quantity of stored resources that are associated with the client entity. Such resources may include owned resources and, in at least some embodiments, borrowed resources (e.g., resources available on credit). The quantity of resources that are available to or associated with the client entity may be reflected by a balance defined in an associated record such as, for example, a bank balance.

In at least some embodiments, the database 151 may store various types of information in connection with customers of a business entity that administers the resource server 150. For example, the database 151 may store customer profile data and financial account data associated with customers. The customer profile data may include, without limitation, personal information of registered customers, authentication credentials of the customers, account identifying information (e.g., checking account, savings account, revolving credit line, etc.), and information identifying services (e.g., banking services, investment management services, etc.) and/or programs that are offered to the customers by the business entity. The financial account data may include portfolio data relating to portfolios of investments that are held by customers. A customer's portfolio data may include, for example, information identifying actual positions held by the customer in various securities, information identifying a "virtual" portfolio composed of simulated positions held by the customer in various securities, and "watch lists" specifying various securities that are monitored by the customer.

The business entity associated with the resource server 150 may provide services that are accessible to the client entity. For example, the business entity may provide account management services, financial transaction services, and investment management services for the client entity. In at least some embodiments, the resource server 150 may be configured to provide a user interface that allows client devices 110 to access the services offered by the business entity. By way of example, the resource server 150 may be configured to provide a website or web-based portal which can be accessed via the client devices 110. The website (or portal) may include web content corresponding to various services offered by the business entity, and the resource server 150 may provide the web content for display on the client devices 110. As another example, the resource server 150 may be associated with a software application which may be installed and/or run on the client devices 110.

The resource server 150 may administer a resource account management platform for managing resource accounts. The resource account management platform may provide, among others, a multimedia content delivery service. Various different content items (e.g., video podcasts, audio slideshows, movies, etc.) may be presented via the resource account management platform, and the multimedia content delivery service may facilitate presentation of the media content items to end users for consumption. In particular, the resource account management platform may be configured to curate multimedia content from multiple different media sources, and provide personalized selections of content items to users of the resource account management platform. The media content items may cover, for example, topics and subject matter which relate to the resources (e.g., holdings of tradeable objects) that users can manage using the resource account management platform.

The resource account management platform may be accessible via client devices 110. For example, the resource account management platform may be accessed using a web interface on the client device 110. Additionally, or alternatively, the resource account management platform may be provided via a user interface of an application, different from a web browser, operating on the client device 110. For example, a resource management application may be stored in memory of the client device 110 and executed thereon for accessing features of the resource account management platform.

The computing environment 100 includes at least one media source server 160. A media source server 160 may be associated with a third-party service that provides multimedia content to one or more different computer systems. Specifically, a media source server 160 may transmit multimedia content to one or more computing devices that request the content. A media source server 160 may host content items locally. Additionally, or alternatively, a media source server 160 may obtain content data from remote sources and transmit the content data to requesting computing devices.

The computing environment 100 also includes an exchange 170. The exchange 170 may be owned, operated, controlled, or used by an exchange entity. The exchange 170 represents a trading platform in which order entry and forwarding, matching of buy and sell orders, and price determination may be performed by a computerized system. In at least some embodiments, the exchange 170 may be an electronic exchange. Orders for tradeable objects (e.g., financial products offered for trading by an exchange) can be placed using the exchange 170. In particular, the exchange 170 may be adapted to receive order messages and match contra-side trade orders to buy and sell tradeable objects.

The resource server 150 is in communication with the exchange 170. In some embodiments, the resource server 150 may be in communication with a gateway that, in turn, is in communication with the exchange 170. The resource server 150 is configured to send instructions to the exchange 170. In particular, the resource server 150 may generate order messages that include trade orders and transmit the order messages to the exchange 170. A trade order may, for example, be a command to place an order to buy or sell a tradeable object, a command to modify or cancel an order, or a combination thereof.

The resource server 150 may generate order messages at the request of an entity, such as a user of client device 110. For example, the user may manually input one or more parameters of a trade order (e.g., order price, quantity, etc.) via the client device 110, and request the resource server 150 to execute the trade order on her behalf. Additionally, or alternatively, the resource server 150 may generate order messages based on trade orders that are automatically generated at the resource server 150. In particular, order messages for transmitting to the exchange 170 may be generated based on trade orders which are automatically generated by the resource server in accordance with various embodiments of the methods disclosed in the present application.

The exchange 170 may additionally be adapted to provide market data. For example, the exchange 170 may publish a data feed to subscribing entities, which may include the client devices 110 and/or the resource server 150.

The client device 110, the resource server 150, the media source server 160 and the exchange 170 may be in geographically disparate locations. Put differently, the client device 110 may be remote from one or both of the resource server 150, the media source server 160 and the exchange 170. As described above, the client device 110, the resource server 150, the media source server 160 and the exchange 170 may be computer systems.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2A:
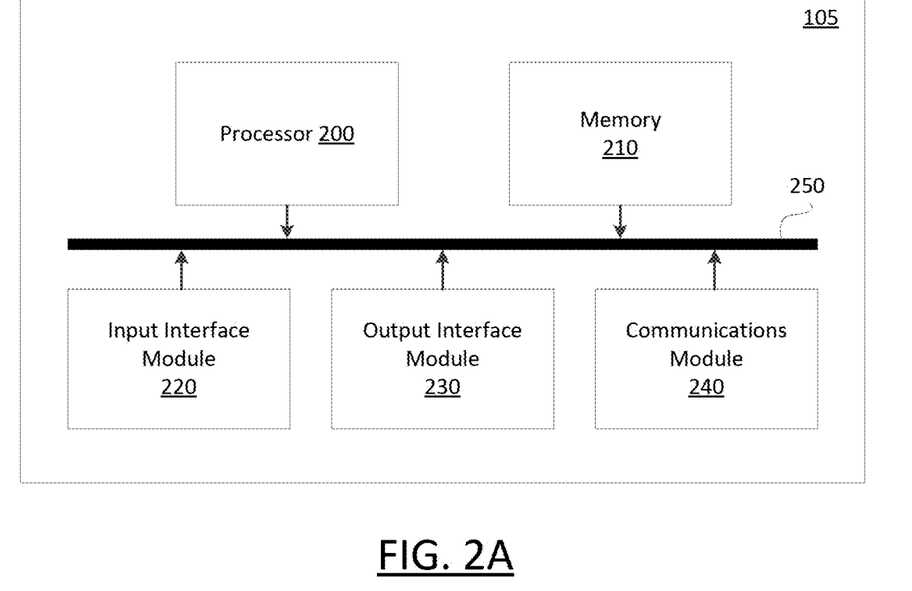
FIG. 2A is a high-level schematic diagram of an example computing device.

FIG. 2A is a high-level operation diagram of an example computing device 105. In some embodiments, the example computing device 105 may be exemplary of one or more of the client devices 110, the resource server 150, the media source server 160 and the exchange 170. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
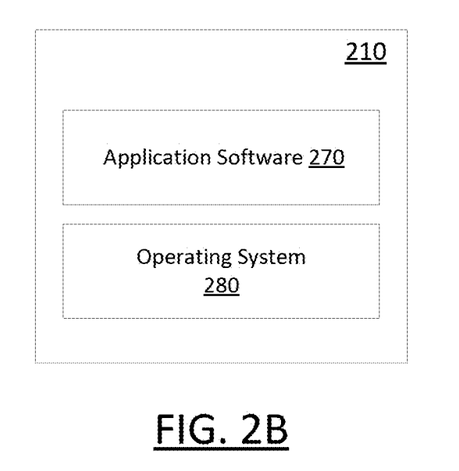
FIG. 2B is a schematic block diagram showing a simplified organization of software components stored in memory of the example computing device of FIG. 2A.

FIG. 2B depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

The application software 270 adapts the example computing device 105, in combination with the operating system 280, to operate as a device performing particular functions. The application software 270 may, for example, include a resource account management application. In some example implementations, a resource account management application may allow users to conduct trading activities in connection with their resource accounts. Specifically, users may buy and sell tradeable objects associated with their resource accounts using a resource account management application. The resource account management application may facilitate conducting trading activity, for example, via an electronic exchange, such as exchange 170 of FIG. 1.

The resource account management application may be a stand-alone application, such as a mobile app, or integrated into another application or software module resident on the example computing device 105 as a sub-function or feature. The resource account management application is associated with a backend application server. In at least some embodiments, a server which manages resource accounts associated with the customers of a business entity, such as the resource server 150 of FIG. 1, may also serve as the backend application server for the resource account management application. In particular, various functions of the resource account management application may be provided, at least in part, by a resource server associated with a bank institution. That is, the resource server may perform backend services of the resource account management application.

Figure 3:
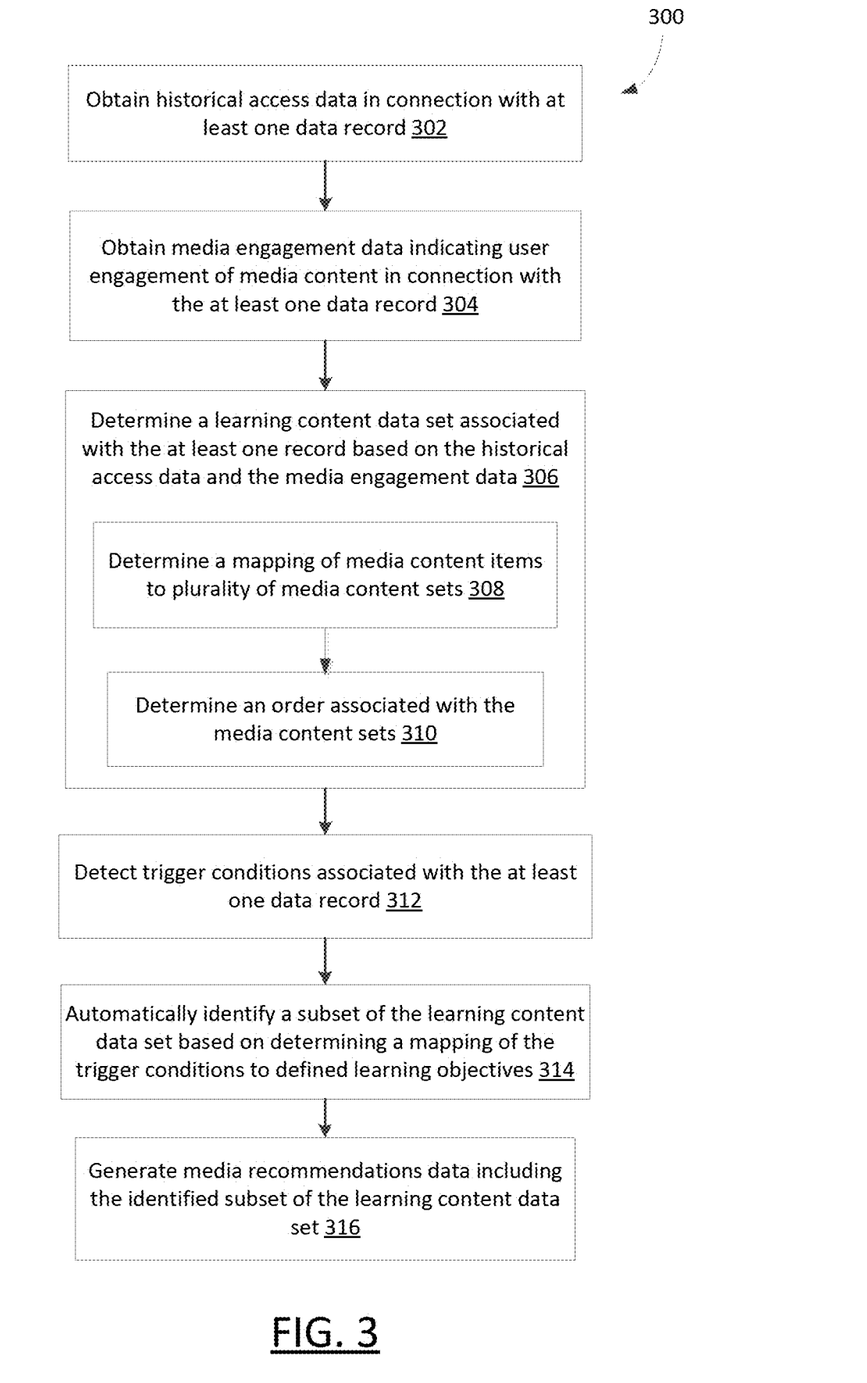
FIG. 3 shows, in flowchart form, an example method for presenting multimedia content on a resource account management platform.

Reference is made to FIG. 3, which shows, in flowchart form, an example method 300 for presenting multimedia content on a resource account management platform. In at least some embodiments, the method 300 may be implemented as part of a process for providing learning tools for account owners that use the resource account management platform. As a specific and non-limiting example, the method 300 may be implemented for presenting multimedia content items as part of a suite of learning tools that can be accessed on a resource account management platform.

Operations 302 and onward may be performed by one or more processors of a computing device such as, for example, the processor 200 (FIG. 2A) of one or more suitably configured instances of the example computing device 105 (FIG. 2A). In at least some embodiments, the method 300 may be performed by a computing system. In particular, a server (such as the resource server 150 of FIG. 1, in some embodiments) which manages a plurality of resource accounts, may perform all or part of the operations of method 300.

In operation 302, the computing system obtains, via a server storing a plurality of data records, historical access data in connection with at least one data record. In at least some embodiments, the at least one data record may be associated with a resource account. For example, the at least one data record may be one of a plurality of data records that are associated with a resource account. The historical access data includes data that relates to access actions in connection with the at least one data record. Access actions may include, for example, transaction events (e.g., buy, sell, etc.) that result in modifications (e.g., debit, credit, etc.) to the at least one data record. That is, the historical access data may include transaction events data such as, for example, historical trading and investment data. More generally, historical access data may include trading and investment activity data in connection with a resource account. For example, the historical access data may include, among others, investment performance data and current investment holdings data for a resource account.

The computing system may query a remote server to obtain historical access data in connection with the at least one data record. For example, the computing system may transmit, to the server, a query identifying a specific data record (and/or a resource account) and a date range for which historical access data for the data record is desired to be retrieved.

A data record (and more broadly, a resource account) may be associated with a specific entity, such as a business or individual. A resource account management platform may allow the entity to access data associated with the data record and/or resource account, as well as multimedia content that may be of relevance to the entity. That is, the resource account management platform may provide multimedia content items for consumption by the entity. In at least some embodiments, the selection of content items for presentation to a particular entity may be customized based on factors such as type of resource account, personal information, etc. That is, the resource account management platform may provide a customized set of multimedia content items for each account owner.

In operation 304, the computing system obtains media engagement data indicating user engagement of media content in connection with the at least one data record. In particular, the media engagement data may include an indication of one or more media content items that are accessed by an entity (i.e., a user of the platform) associated with the at least one data record. The media engagement data may identify, for example, the media content items accessed by the entity via the platform, date and/or time of access, number of times and duration of engagement of the media content items, the entity's reactions (e.g., likes, dislikes) to the media content items, and the like. In some embodiments, the computing system may generate preference data for the entity based on the media engagement data. The preference data may indicate, for example, media content properties (e.g., media type, genre, length, etc.) that are preferred for consumption by the entity on the platform.

In operation 306, the computing system determines a learning content data set associated with the at least one data record. A learning content data set contains educational content data that may be specifically tailored and delivered to a user (i.e., a resource account owner). In at least some embodiments, the learning content data set may include a plurality of media content sets that are associated with defined learning objectives. Learning objectives are data representations of intentions with respect to learning for individual account owners. A learning objective may, for example, be associated with one or more success criteria, and a learning objective may be determined to be attained upon detecting that the associated success criteria are satisfied.

One or more learning objectives may be associated with a resource account based on goals, needs, etc. of the account owner. A learning content data set may include multiple sets of content items corresponding to distinct learning objectives that are associated with the resource account.

The learning objectives associated with a resource account may be determined in various different ways. In some embodiments, a user associated with the resource account may provide input to the computing system indicating one or more learning objectives (or goals, needs, tasks, etc.). The learning objectives may, for example, be defined based on text input identifying areas of resource management literacy for which the user desires to improve or acquire additional information. The inputted text may be processed by the computing system and one or more defined learning objectives that correspond to the content of the text input may be assigned to the user's resource account. In some embodiments, the computing system may be configured to automatically determine learning objectives based on information associated with the resource account and/or the account owner. For example, the computing system may select from a predetermined list of learning objectives and assign the selection of learning objective(s) to the resource account.

The learning content data set is determined based on, at least, the historical access data and the media engagement data. That is, the computing system determines the sets of learning content items for the resource account based on historical access data associated with the at least one data record (of the resource account) and the media engagement data. In some embodiments, the computing system may obtain additional data in connection with the resource account and/or account owner and determine the learning content data set based on the additional data. For example, the computing system may obtain asset data such as, for example, account balance and asset allocations data. As another example, the computing system may obtain customer data associated with the account owner which may include, for example, personal data (e.g., life events), wealth and investment goals, research activities data, risk tolerance data, survey response data, and the like.

The computing system may have access to one or more databases storing media content items that are available for presenting on the resource account management platform. The databases may be maintained, for example, by media servers (such as media source server 160 of FIG. 1). When determining the learning content data set, the computing system determines a mapping of media content items to the plurality of media content sets, in operation 308. In particular, the computing system may determine a set of all available media content items for the platform and identify mappings of the media content items to the media content sets of the learning content data set. For example, each media content item that is available for presenting on the platform may be associated with (or assigned to) one or more media content sets by the mapping.

In at least some embodiments, the computing system may process the media content items and classify the media content items based on tag data associated with the media content items. For example, the computing system may process metadata associated with the media content items, parse the metadata to identify content tags, and classify the media content items into one or more media content sets based on the content tags. The media content sets may each be associated with a respective list of predefined tags. A media content item may be assigned to a media content set if the media content item is associated with a content tag that is included in the list of predefined tags for the media content set. In some embodiments, a media content item may be assigned to multiple different media content sets.

In addition to classifying media content items into media content sets of the learning content data set, the computing system may determine an order associated with each of the media content sets, in operation 310. In some embodiments, the computing system may determine, for each media content set, a sequence for presenting the media content items of the media content set to a user associated with the at least one data record (e.g., resource account owner). By determining a suitable sequence of presenting the media content items, the computing system may define a path or trajectory of learning for an account owner by controlling the delivery of educational content of the media content items. The sequence may, for example, be determined based on content data associated with the media content items and a current learning status associated with the user in relation to the learning objectives assigned to the user's resource account.

The computing system may store the learning content data set in association with the at least one data record and/or the resource account. In particular, the computing system may track the learning objectives that are assigned to a resource account and the media content items corresponding to the assigned learning objectives that are available for presenting on the resource account management platform. The learning content data set may thus represent a set of educational media content items that are suitable for presenting to the account owner.

In operation 312, the computing system detects one or more trigger conditions associated with the at least one data record. The trigger conditions may represent conditions that prompt a delivery of selected media content items to an entity (e.g., account owner) associated with a resource account. The trigger conditions may relate to, for example, specific events, defined ranges or thresholds, etc. that are associated with the at least one data record and/or resource account. For each resource account that is managed using the platform, the computing system may store a predefined list of trigger conditions. In some embodiments, the computing system may receive user input defining one or more trigger conditions. For example, a user may provide, using their computing device, definition of their goals, needs, etc. that, in turn, identify relevant events, ranges, and/or thresholds which may serve as trigger conditions for the user's resource account. Additionally, or alternatively, the computing system may automatically determine one or more trigger conditions based on account data, learning objectives, etc. that are associated with the resource account.

In some embodiments, detecting a trigger condition may comprise detecting a change to one or both of the historical access data and the media engagement data. By way of example, if the computing system detects a change in a quantity of resources associated with the at least one data record based on data record access actions, the computing system may determine that a trigger condition has been satisfied. As another example, a trigger condition may be detected if investment performance data for the at least one data record (or resource account) indicates that a performance level has fallen below a predefined threshold. As yet another example, a trigger condition may be detected if a current allocation (e.g., ratio) of an investment portfolio associated with the resource account diverges from a predefined allocation by more than a threshold amount.

In some embodiments, the computing system may determine that a trigger condition has been satisfied if a change in media preference data is detected. For example, the computing system may monitor the media content that is consumed by the user (i.e., account owner) on the resource account management platform and determine whether there are any changes in consumption patterns and/or user-preferred media content items (e.g., media type, length, topic, etc.). A change may be detected, for example, if media engagement data indicates that recently consumed media content are of a different media type, topic, etc. when compared with historical media consumption data for the user.

In response to detecting a trigger condition, the computing system may select one or more media content items and present the selected content items via the resource account management platform. The media content items may be selected, for example, from a set of all available media content items to which the computing system has access. More specifically, the computing system automatically identifies a subset of the learning content data set, in operation 314. That is, one or more of the content items of the learning content data set are selected by the computing system. The subset of content items is identified based on determining a mapping of the one or more trigger conditions to at least one of the defined learning objectives. In particular, based on the trigger condition that is detected, the computing system may identify learning objectives that are associated with the detected trigger condition and select one or more content items from the media content sets corresponding to the identified learning objectives.

In some embodiments, the computing system may detect a particular change to resource account data (e.g., resource quantity, investment performance, etc.) for a resource account and identify one or more learning objectives that are associated with the detected change. For example, if the investment performance associated with a resource account, such as a trading account, falls below a defined threshold level, the computing system may identify a learning objective that relates to enhancing investment (e.g., long-term investments, options trading, etc.) strategies. As another example, if the account data for a user's resource account indicates that the account owner has specified a retirement age and wealth objectives for retirement, the computing system may detect a condition relating to time until the account owner's retirement and identify a mapping of the condition to learning objectives relating to investment strategies for enhancing retirement wealth within the remaining time to retirement.

More generally, the computing system maps the detected condition(s) to suitable learning objectives that are designed for attaining defined goals, intents, etc. in view of the detected conditions, and selects one or more content items from the media content sets corresponding to the learning objectives.

In operation 316, the computing system generates media recommendation data that includes the identified subset of media content items of the learning content data set. The media recommendation data represents media content that is selected for a specific user in connection with at least one data record associated with the user's resource account. In particular, the media recommendation data comprises media content items containing educational content that may be relevant for a resource account owner using the resource account management platform.

In at least some embodiments, the computing system may transmit, to a client device associated with the account owner, media content items associated with the media recommendations data. More particularly, the computing system may cause a customized set of media content items to be displayed on the client device of the account owner. The recommended media content items may then be displayed on the client device, for example, via a user interface associated with a resource account management platform. For example, the recommended media content may be displayed on a graphical user interface of a resource account management platform when the account owner logs in to their account (using a web browser, mobile application, etc.).

Figure 4:
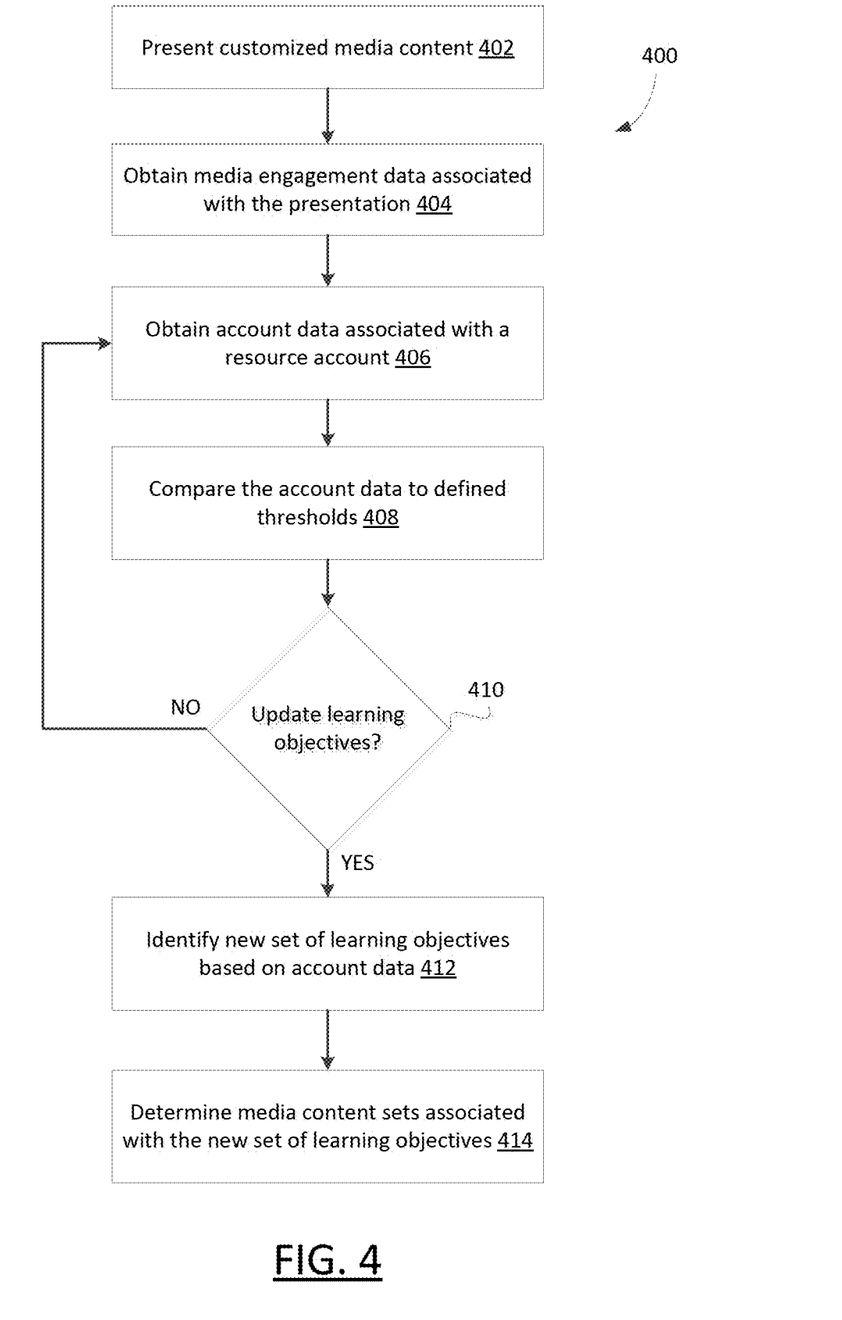
FIG. 4 shows, in flowchart form, an example method for generating an updated set of multimedia content to provide on a resource account management platform.

Reference is made to FIG. 4, which shows, in flowchart form, an example method 400 for generating an updated set of multimedia content to provide on a resource account management platform. In at least some embodiments, the method 400 may be implemented as part of a process for providing learning tools for account owners that use the resource account management platform. As a specific and non-limiting example, the method 400 may be implemented for presenting multimedia content items as part of a suite of learning tools that can be accessed on a resource account management platform.

Operations 402 and onward may be performed by one or more processors of a computing device such as, for example, the processor 200 (FIG. 2A) of one or more suitably configured instances of the example computing device 105 (FIG. 2A). In at least some embodiments, the method 400 may be performed by a computing system. In particular, a server (such as the resource server 150 of FIG. 1, in some embodiments) which manages a plurality of resource accounts, may perform all or part of the operations of method 400. The operations of method 400 may be performed in addition to, or as alternatives of, one or more of the operations of method 300 of FIG. 3.

In operation 402, the computing system presents customized media content to a resource account owner. The customized media content comprises media content items that are specifically selected for the resource account owner. In particular, the customized media content may include those content items that are selected for a user based on account data (e.g., transaction events data, personal information, trading and/or investment portfolio data, etc.) and media engagement data in connection with the user's resource account. The selection and presentation of media content items may be performed in a similar manner as the operations of method 300 of FIG. 3. The customized media content may be presented, for example, via a graphical user interface of a resource account management platform.

In operation 404, the computing system obtains media engagement data in connection with the customized media content. That is, the computing system tracks the account owner's engagement with the customized set of media content items that are presented to the account owner. For example, the computing system may determine those of the selected media content items that are actually consumed by the account owner and obtain analytics relating to the media content engagement.

In at least some embodiments, the computing system may determine a current learning status associated with the resource account based on the media engagement data. By tracking media engagement data, the computing system may determine a progress status with respect to one or more of the learning objectives that are associated with a resource account. For example, based on the number of content items of a media content set that are actually accessed (i.e., viewed, listened to, etc.) by the account owner, the computing system may determine a progress status of the account owner with respect to the media content set (and the corresponding learning objective). In a similar manner, a progress status may be determined with respect to a learning "curriculum" comprising a plurality of media content sets corresponding to different learning objectives, based on media engagement data for the account owner.

The computing system obtains account data associated with the user's resource account, in operation 406, and compares the account data to one or more defined thresholds in operation 408. In particular, current values of account variables (e.g., account balance, investment performance, personal information of account owner, etc.) for the resource account may be compared to respective threshold values that are predefined for those variables.

In operation 410, the computing system determines whether the learning objectives that are currently associated with the resource account should be updated. In at least some embodiments, the determination is made based on at least one of the account data for the user's resource account and the media engagement data associated with the customized media content. For example, if the computing system detects that values for one or more account variables has fallen below respective thresholds, the computing system may determine that learning objectives for the resource account need to be updated. As another example, based on a learning progress of the account owner, as indicated by a current progress status represented by the media engagement data, the computing system may determine that learning objectives need to be updated for the account owner (e.g., new or modified objectives).

If the computing system determines to update the learning objectives, the computing system identifies a new set of learning objectives based on the account data for the resource account, in operation 412. The new set of learning objectives may be a data set that contains at least one different learning objective from a set of learning objectives that was previously associated with the resource account.

In operation 414, the computing system determines media content sets corresponding to the newly identified set of learning objectives for the resource account. That is, the computing system determines sets of media content items that correspond to the updated set of learning objectives. For example, the computing system may assign each of one or more media content items that are available for presenting on a resource account management platform to media content sets corresponding to the updated set of learning objectives.

Figure 5:
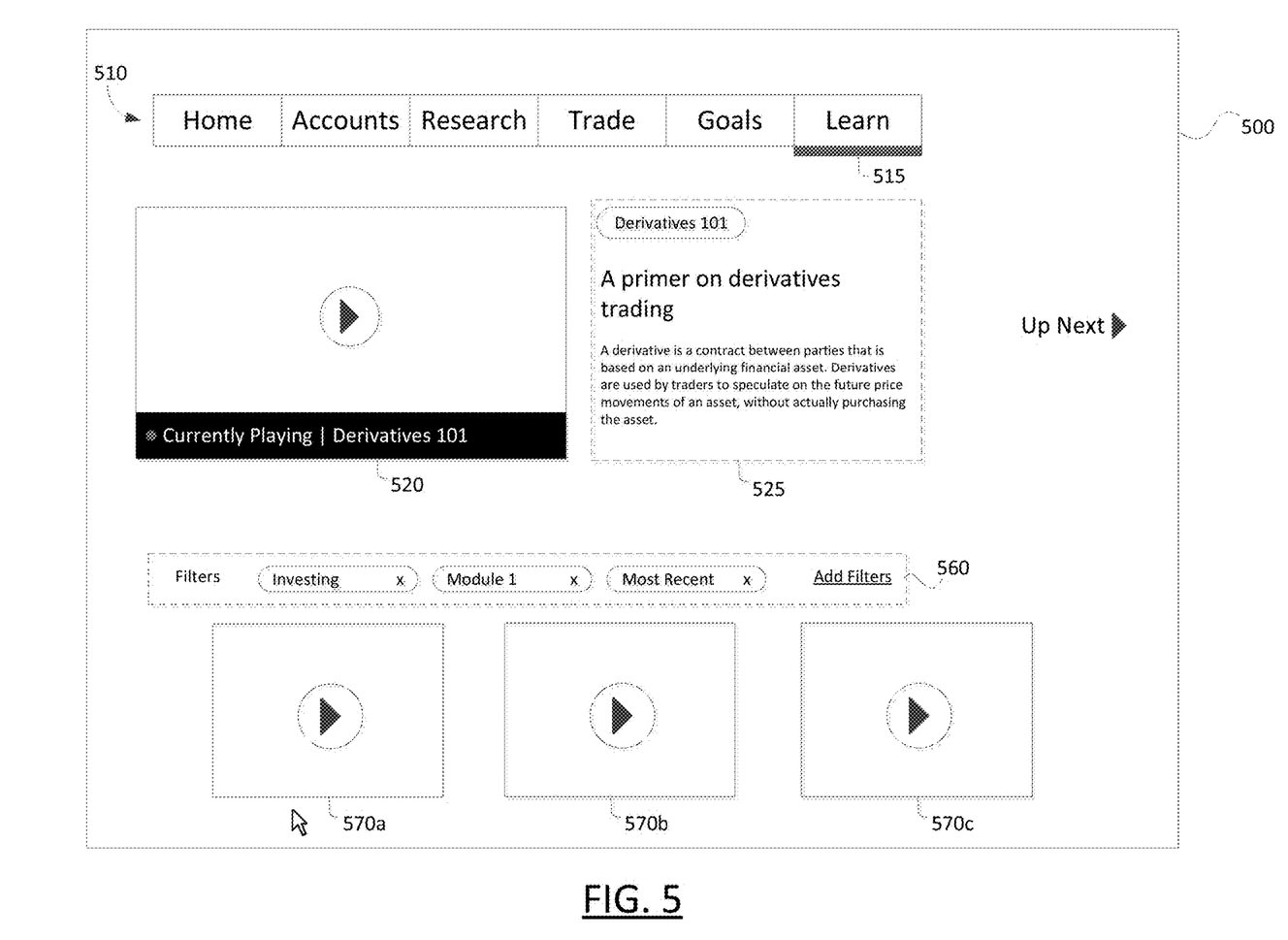
FIG. 5 shows an example graphical user interface of an application for managing resource accounts.

FIG. 5 shows an example graphical user interface 500 of an application for managing resource accounts. For example, the graphical user interface 500 may be an interface that is associated with a resource account management platform. The graphical user interface 500 may allow users to perform various actions relating to management of their resources, such as financial resources (e.g., cash, investments, etc.). In particular, an account owner may access resource data and account operations in connection with at least one data record associated with their resource account using the graphical user interface 500.

The graphical user interface 500 includes a navigation bar 510 and a plurality of user interface elements 515 corresponding to different pages of the graphical user interface 500. A "LEARN" page of the user interface is shown in FIG. 5. The "LEARN" page may allow a user of the graphical user interface 500 to access various learning tools. More specifically, a user may access tools for learning about various topics that are relevant to the user's resource account, such as resource data and account operations.

The "LEARN" page, as well as other pages of the graphical user interface 500, may include media content. A video playback interface 520 is shown in FIG. 5. This video playback interface 520 may play videos that are available for presenting on the resource account management application. For example, videos that are selected by users via the graphical user interface 500 may be shown in the video playback interface 520. Additionally, or alternatively, videos may be selected automatically and begin playing in the video playback interface 520 when a user lands on the "LEARN" (or another) page of the graphical user interface 500.

The "LEARN" page may present videos which are recommended for a user of the resource account management application. The videos may be selected, at least in part, based on a mechanism that integrates operations of one or more of method 300 of FIG. 3 and method 400 of FIG. 4 for providing customized media content for consumption. The graphical user interface 500 a video description area 525 and videos 570a-570c for presenting to a user of the resource account management platform. The graphical user interface 500 also includes a plurality of user interface elements in a video filter area 560 for allowing users to select one or more filter criteria. The selected filter criteria may be applied in presenting the videos which are most relevant for a particular user. For example, the filter criteria may be applied to further narrow the subset of videos which are selected for the user by the customized media content curation mechanism described in the present disclosure.

Figure 6:
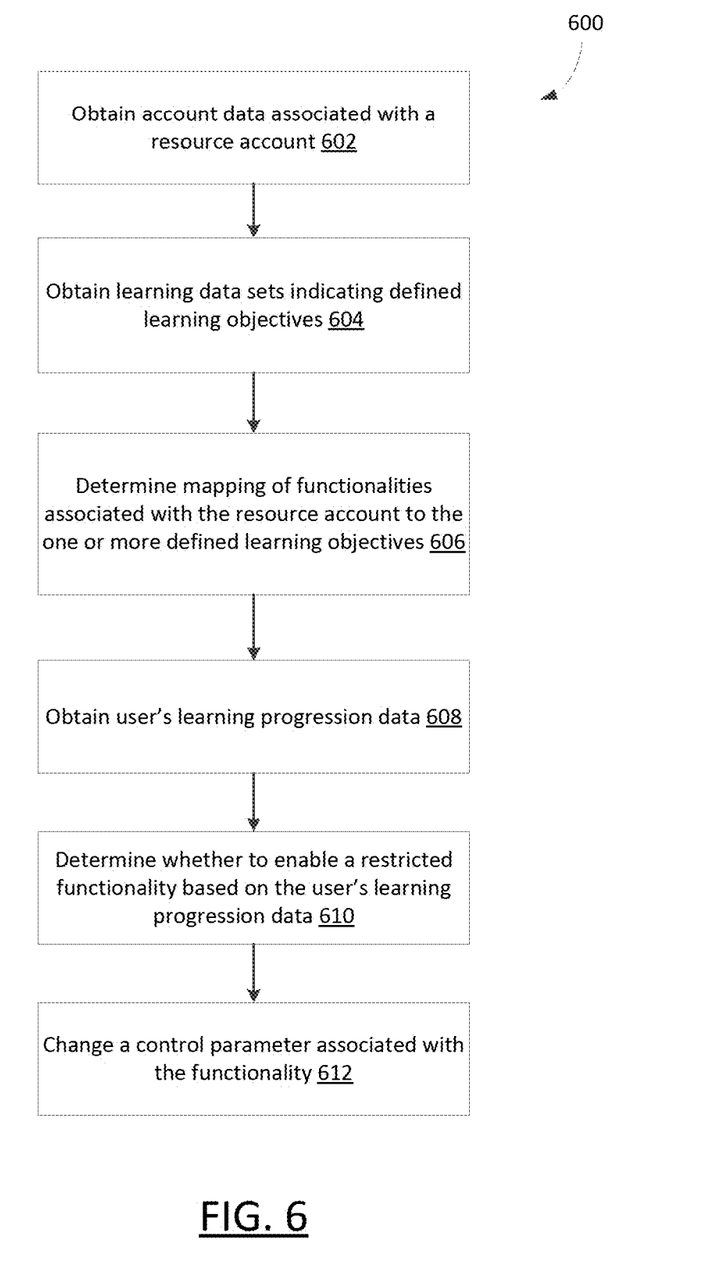
FIG. 6 shows, in flowchart form, an example method for controlling user access to functionalities of a resource account management platform.

Reference is made to FIG. 6, which shows, in flowchart form, an example method 600 for controlling user access to functionalities of a resource account management platform. In at least some embodiments, the method 600 may be implemented as part of a process for providing learning tools for account owners that use the resource account management platform. As a specific and non-limiting example, the method 600 may be implemented for presenting multimedia content items as part of a suite of learning tools that can be accessed on a resource account management platform.

Operations 602 and onward may be performed by one or more processors of a computing device such as, for example, the processor 200 (FIG. 2A) of one or more suitably configured instances of the example computing device 105 (FIG. 2A). In at least some embodiments, the method 600 may be performed by a computing system. In particular, a server (such as the resource server 150 of FIG. 1, in some embodiments) which manages a plurality of resource accounts, may perform all or part of the operations of method 600. The operations of method 600 may be performed in addition to, or as alternatives of, one or more of the operations of method 300 of FIG. 3 and method 400 of FIG. 4.

The customized media content for a user of a resource account management platform may be may be provided as part of an integrated learning "journey". The resource account management platform may be designed to guide users through customized lessons (or courses, modules, etc.) as part of personalized learning in connection with resource management. This guided learning feature of the resource account management platform may be entwined with techniques for controlling user access to functionalities of the resource account management platform. More specifically, access to certain capabilities/functionalities of the resource account management platform may be controlled based on detecting conditions associated with defined learning objectives.

By way of example, in some instances, there may be certain regulatory requirements associated with trading activities (e.g., options trading) in connection with various types of resources. As the resource account management platform enables self-directed trading, it may be important to be able to control user access to select functionalities of the resource account management platform and tie the access control to verification of knowledge and understanding requirements for account owners.

In some embodiments, the computing system associated with the resource account management platform may restrict access to certain functionalities within the platform based on user learning progression data. The user learning progression data may indicate, at least, a mapping of platform functionalities to one or more of the defined learning objectives. A platform functionality may be mapped to a single learning objective or a plurality of learning objectives.

The user learning progression data may include an indicator of learning status for an account owner. For example, a learning status indicator may identify those learning objectives that an account owner has achieved. The learning status indicator may be derived in various different ways. In some embodiments, the learning status indicator may be determined based on the user-specific data, which may include transaction events data, financial accounts data, and personalization data for the account owner. In some embodiments, the learning status indicator may be determined based on monitoring user interactions with a user interface associated with the resource account management platform. For example, user feedback actions which indicate that the user has viewed certain media content items, actuated certain user interface elements, provided certain data input, etc. may inform the determination of the user's learning status indicator.

The computing system determines whether to enable a restricted functionality based on a user's learning progression data. The learning progression data may identify, for example, those learning objectives which a user has achieved/completed, or indicate a percentage of completion. Depending on the mapping of functionalities to learning objectives, the computing system may determine whether all or part of the mapped learning objectives have been indicated as being completed based on the user's learning progression data. If the mapped learning objectives are indicated as being completed, the computing system may remove the restriction on the impugned functionality.

In operation 602, the computing system obtains user-specific data associated with a user's resource account. The user-specific data may include, at least, transaction events data, financial accounts data, and personalization data for the resource account. Some of the user-specific data may be obtained based on direct input from client devices (e.g., survey and questionnaire responses), while some of the user-specific data may be obtained based on monitoring historical data associated with the user's resource account. For example, the user-specific data may include: historical trading data, investment performance data, current investment holdings data, current account balance, asset allocation data, financial objectives data, risk tolerance, and market research activities data.

In operation 604, the computing system obtains learning data sets defining one or more learning objectives. The learning data sets may be stored in memory at the computing system or accessible to the computing system. The learning objectives may be predefined (e.g., standard set of learning objectives applicable for any investor) or they may be customized by users. For example, when a user creates an account on the resource account management platform, the user may select from a list of predefined learning "goals", or they may define their own learning objectives using a graphical user interface for the resource account management platform.

In operation 606, the computing system determines mapping of resource account management platform functionalities to the one or more learning objectives. The platform functionalities may include, for example, select types of trading activities (e.g., options trading), advanced market research, asset allocation for one or more of the user's financial accounts, etc. The functionalities which may be restricted may also include premium content/features.

In operation 608, the computing system obtains the user's learning progression data based on, at least, tracking data indicating interactions by the user with a user interface of the resource account management platform displayed on the user's client device. The user's learning progression data may also be obtained based on the user-specific data (e.g., customer personalization data indicates certification, trading history data indicates knowledge/aptitude, etc.).

In operation 610, the computing system determines whether to enable a restricted functionality based on the user's learning progression data. For example, if the user's learning progression data indicates that the user has achieved all or a select subset of the learning objectives associated with the restricted functionality, the computing system may determine that the functionality should be enabled. In this operation, the computing system may determine what, if any, learning objectives remain to be achieved before the restricted functionality may be enabled.

In operation 612, in response to determining that the restricted functionality should be enabled, the computing system changes a control parameter associated with the restricted functionality on the resource account management platform.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
   a processor;
   a communications module coupled to the processor; and
   a memory coupled to the processor, the memory storing instructions that, when executed, configure the processor to:
   obtain, via a server storing a plurality of data records, historical access data in connection with at least one data record;
   obtain media engagement data indicating user engagement of media content in connection with the at least one data record;
   determine a learning content data set associated with the at least one data record based on the historical access data and the media engagement data, the learning content data set including a plurality of media content sets that are associated with defined learning objectives, wherein determining the learning content data set includes:
   determining a mapping of media content items to the plurality of media content sets; and
   determining an order associated with the media content sets,
   detect one or more trigger conditions associated with the at least one data record; and
   in response to detecting the one or more trigger conditions:
   automatically identify a subset of the learning content data set based on determining a mapping of the one or more trigger conditions to at least one of the defined learning objectives; and
   generate media recommendation data including the identified subset of the learning content data set, wherein the media recommendation data includes a plurality of media recommendations.

2. The computing system of claim 1, wherein the at least one data record is associated with a resource account and wherein the historical access data comprises transaction events data in connection with the resource account.

3. The computing system of claim 1, wherein the media engagement data comprises an indication of one or more media content items that are accessed by a user associated with the at least one data record.

4. The computing system of claim 1, wherein determining the order associated with the media content sets comprises determining a sequence for presenting the media content items of the plurality of media content sets to a user associated with the at least one data record.

5. The computing system of claim 4, wherein the sequence is determined based on content data associated with the media content items and a current learning status associated with the user in relation to the defined learning objectives.

6. The computing system of claim 1, wherein the learning objectives are defined based on user input associated with the at least one data record.

7. The computing system of claim 1, wherein detecting the one or more trigger conditions associated with the at least one data record comprises detecting a change to at least one of the historical access data or the media engagement data.

8. The computing system of claim 7, wherein detecting a change to the historical access data comprises determining a change in a quantity of resources associated with the at least one data record based on data record access actions.

9. The computing system of claim 7, wherein detecting a change to the media engagement data comprises detecting a change in preference data for media content items consumed in connection with the at least one data record.

10. The computing system of claim 1, wherein the instructions, when executed, further configure the processor to transmit media content items associated with the media recommendation data.

11. A computer-implemented method, comprising:
obtaining, via a server storing a plurality of data records, historical access data in connection with at least one data record;
obtaining media engagement data indicating user engagement of media content in connection with the at least one data record;
determining a learning content data set associated with the at least one data record based on the historical access data and the media engagement data, the learning content data set including a plurality of media content sets that are associated with defined learning objectives, wherein determining the learning content data set includes:
determining a mapping of media content items to the plurality of media content sets; and
determining an order associated with the media content sets,
detecting one or more trigger conditions associated with the at least one data record; and
in response to detecting the one or more trigger conditions:
automatically identifying a subset of the learning content data set based on determining a mapping of the one or more trigger conditions to at least one of the defined learning objectives; and
generating media recommendation data including the identified subset of the learning content data set, wherein the media recommendation data includes a plurality of media recommendations.

12. The method of claim 11, wherein the at least one data record is associated with a resource account and wherein the historical access data comprises transaction events data in connection with the resource account.

13. The method of claim 11, wherein the media engagement data comprises an indication of one or more media content items that are accessed by a user associated with the at least one data record.

14. The method of claim 11, wherein determining the order associated with the media content sets comprises determining a sequence for presenting the media content items of the plurality of media content sets to a user associated with the at least one data record.

15. The method of claim 14, wherein the sequence is determined based on content data associated with the media content items and a current learning status associated with the user in relation to the defined learning objectives.

16. The method of claim 11, wherein the learning objectives are defined based on user input associated with the at least one data record.

17. The method of claim 11, wherein detecting the one or more trigger conditions associated with the at least one data record comprises detecting a change to at least one of the historical access data or the media engagement data.

18. The method of claim 17, wherein detecting a change to the historical access data comprises determining a change in a quantity of resources associated with the at least one data record based on data record access actions.

19. The method of claim 17, wherein detecting a change to the media engagement data comprises detecting a change in preference data for media content items consumed in connection with the at least one data record.

20. The method of claim 11, further comprising transmitting media content items associated with the media recommendation data.

* * * * *